(12) United States Patent
Mukherjee et al.

(10) Patent No.: US 7,921,226 B2
(45) Date of Patent: Apr. 5, 2011

(54) USER SPECIFIC REQUEST REDIRECTION IN A CONTENT DELIVERY NETWORK

(75) Inventors: Sarit Mukherjee, Morganville, NJ (US); Sampath Rangarajan, Bridgewater, NJ (US); Pablo Rodriquez, Cambridge (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1233 days.

(21) Appl. No.: 10/894,725

(22) Filed: Jul. 20, 2004

(65) Prior Publication Data

US 2006/0020684 A1    Jan. 26, 2006

(51) Int. Cl.
*G06F 15/173* (2006.01)
*G06F 15/16* (2006.01)

(52) U.S. Cl. ......................... 709/238; 709/246
(58) Field of Classification Search .................. 709/232, 709/238, 239, 240, 241, 242, 245, 203, 217
See application file for complete search history.

(56) References Cited

U.S. PATENT DOCUMENTS

| | | | | |
|---|---|---|---|---|
| 5,890,171 A | * | 3/1999 | Blumer et al. ............. | 715/229 |
| 6,049,821 A | * | 4/2000 | Theriault et al. ........... | 709/203 |
| 6,389,462 B1 | | 5/2002 | Cohen et al. | |
| 6,393,468 B1 | * | 5/2002 | McGee .......................... | 709/218 |
| 6,397,246 B1 | * | 5/2002 | Wolfe ............................ | 709/217 |
| 6,654,786 B1 | * | 11/2003 | Fox et al. ..................... | 709/203 |
| 6,754,699 B2 | * | 6/2004 | Swildens et al. ............ | 709/217 |
| 7,240,100 B1 | * | 7/2007 | Wein et al. ................... | 709/214 |
| 2001/0015956 A1 | * | 8/2001 | Ono ............................. | 370/229 |
| 2002/0078147 A1 | * | 6/2002 | Bouthors et al. ............. | 709/203 |
| 2002/0099852 A1 | * | 7/2002 | Fischer ......................... | 709/246 |
| 2006/0002299 A1 | * | 1/2006 | Mushtaq et al. ............. | 370/236 |
| 2006/0004717 A1 | * | 1/2006 | Ramarathnam et al. ......... | 707/3 |
| 2008/0288635 A1 | * | 11/2008 | Jaye ............................. | 709/224 |

* cited by examiner

*Primary Examiner* — Jeffrey Pwu
*Assistant Examiner* — Shaq Taha
(74) *Attorney, Agent, or Firm* — Wall & Tong, LLP

(57) ABSTRACT

A method and apparatus for providing user specific request redirection in a content delivery network includes parsing a page having embedded objects intended for redirection to at least one cache server, and transforming the embedded objects into relative uniform resource locators (URLs). A content-base token is inserted into an HTTP response header in response to a user request for the page. In an instance where the content-base token is not supported by the server and/or client devices, a base token is inserted into the page in response to a user request for the page. The content-base token and base token provide identification of a server or URL prefix where the embedded objects in the page are to be retrieved. The requested page is then sent to the user's browser. The browser constructs absolute URLs from the embedded URLs using either the received content-base token or base token, to retrieve embedded objects from the server.

31 Claims, 8 Drawing Sheets

```
<img = /www.xyz.com/fashion/style.gif>            ⏜ 406/408
<img = /www.xyz.com/bews/latest.gif>
<href = /www.xyz.com/news/headlines.html>
<href = /www.xyz.com/news/europe.html>
```

```
<img = www.cdsp.com/www.xyz.com/fashion/style.gif>   ⏜ 504
<img = www.cdsp.com/www.xyz.com/bews/latest.gif>
<href = www.cdsp.com/www.xyz.com/news/headlines.html>
<href = www.cdsp.com/www.xyz.com/news/europe.html>
```

FIG. 5

USER SPECIFIC REQUEST REDIRECTION IN A CONTENT DELIVERY NETWORK

FIELD OF INVENTION

The present invention relates to packet-switched computer networks, and more specifically, to a method and apparatus for providing personalized content in response to user requests for such content in a content delivery network.

DESCRIPTION OF THE BACKGROUND ART

Content Delivery Service Providers (CDSP), such as Akamai Technologies, Inc. of Cambridge, Mass., Speedera Networks, Inc. of Santa Clara, Calif., among others, distribute content from origin sites to cache servers on the edge of the network, and deliver content to the users from these edge servers (referred to as Content Delivery Servers (CDSs)). The distribution mechanism may be based on push technologies such as multicasting the data to all the edge servers through terrestrial or satellite links, and/or pull technologies such as those used by proxies. The goal is to decrease the latency of user access to the objects by delivering the objects from an edge server closest to the user.

A content delivery network (CDN) comprises a set of CDSs dispersed across the Internet, as well as a domain name server (DNS) infrastructure, which is used to route user requests to the nearest CDS. The DNS requests sent from the user browser need to be directed to the DNS of the CDSP. One technique is for the CDSP to "takeover" the DNS functionality of the origin site so as to become the "authoritative DNS" for the origin site. This is an easy approach to implement, but the problem with this approach is that all the objects from the domain that has been taken over needs to be served from the content delivery servers. This technique will not work, for example, if it is required that all the html pages are served from the origin site, but all the images (e.g., gifs and jpgs) are served from the CDSs.

In a second approach, termed "uniform resource locator (URL) rewrite," the authoritative DNS functionality still stays with the origin site's DNS. Any top level page requested by a user will be served from the origin server. However, before the page is served, some or all of the embedded links found in the top level page are rewritten to point to the CDSP DNS, so that requests to embedded objects can be redirected by the CDSP DNS to the closest CDS.

The main objective of performing user specific request redirection is to provide service differentiation based on user specific information. User specific request redirection refers to the process of redirecting requests to the same set of embedded objects in a top level page, arriving from different users, to different CDSs, based on user and/or other information. User specific request redirection is useful for providing quality-of-service (QOS) differentiation, elimination of inaccuracies due to DNS based redirection, and performance enhancement.

With user specific redirection, it becomes possible for the content provider to instruct the CDSP to provide different service levels to different users. For example, if two users carrying cookies "priority=high" and "priority=low" access a top-level page, the CDSP could provide the requested page with some or all URLs rewritten in different ways, so that the service level provided to these two users, when they access the embedded objects in the top-level page, is different. The CDSP may provide service differentiation by using DNS hierarchy, URL rewriting, or a combination of both.

Service differentiation using DNS hierarchy redirects the embedded object URLs to two different CDSP DNS hierarchies. One DNS hierarchy resolves the DNS query to one of a set of fast servers close to the user, and the other DNS hierarchy resolves the query to one of a set of slower servers, or a server that is on a site with limited bandwidth. In addition, requests from two different users could be redirected to two different service provider networks. For example, a high priority user may be directed to www.cdsp1.com DNS hierarchy, which provides fast service but costs more, while the low priority user may be directed to www.cdsp2.com, which provides slower service but is cheaper.

Alternatively, service differentiation may be provided by using a URL prefix to redirect user requests. In particular, if URL rewriting is used to redirect user requests, when URLs are rewritten, different prefixes can be added to the URL path to provide indication to the CDS about the service level that should be provided to the user. For example, if embedded objects are prefixed with level 1 when the top level page is served to one user, and with level 2 when it is served to another user, this could indicate to the CDS that if both requests arrive at the CDS, the request with a prefix of level 1 should be provided better service than the one with the prefix level 2.

Of the two redirection mechanisms discussed above, the authoritative DNS is not flexible enough to provide user specific request redirection because DNS requests do not carry any user specific information. Although the URL rewrite is a possible option for this purpose, it is not deemed a viable option for user specific redirection in practice. The URL rewrite process involves rewriting the embedded links inside an html page to point to the CDSP DNS. For the most part, embedded objects that are automatically retrieved by the browser are images that are large and will benefit from being served from the edge. During the content delivery process, the request to the top level page is sent to the content provider's origin server. DNS requests to resolve the rewritten URLs inside the top level page will then be sent to the CDSP's DNS. The CDSP DNS server returns the IP address for the CDS which is "closest" to the user. The requests for these objects are then sent to this CDS, where the objects are retrieved.

Normally, the process of URL rewrite is performed statically using a commercially available software tool, where pages that need to be rewritten are parsed and the embedded URLs are rewritten. This technique does not provide the flexibility to rewrite the same page in multiple different ways. For example, static URL rewriting does not provide different versions of the rewritten page to different users, in order to personalize downloads of embedded objects based on information found in user requests (which is what is needed for user specific redirection). Thus, static URL rewriting is not a valid option for user specific redirection.

CDSP companies have also partnered with caching and switching vendors to provide what is referred to as "dynamic URL rewrite." In this technique, a reverse proxy cache or a load balancing switch is placed in front of the content provider's servers to perform URL rewrite on the objects. The transformations that are required to be performed are downloaded into the device. When a user request is received at the device for the first time, the request is sent to a server and the object is retrieved. This object is then URL-rewritten at the proxy/switch and then sent to the user.

There are two obvious ways in which dynamic URL rewrite may be used to implement user specific redirection. One technique is that every time a user request is received, the html page is parsed and the embedded URLs are transformed appropriately based on the requesting user. For example, if the transformation is performed based on IP addresses, each URL will be transformed to point to the IP address of the best server for that user. The first technique for dynamic URL rewrite may not be practical as the html page needs to be parsed every time a user request is received.

A second technique is that all the embedded URLs in the page are rewritten a priori in all possible ways in which it needs to be delivered to the users and all these copies are cached. When a user request is received, the appropriate page is delivered. The second technique may only be possible if the number of ways in which URL rewrite needs to be performed on a page is small. However, if the number of ways in which URL rewrite is performed is large, then the second technique is not viable.

Specifically, URL rewrite may be performed by using the IP address or domain name of the server. If the transformation is performed using IP addresses, then the number of ways in which URL rewrite can be performed on a page equals the number of server IP addresses. However, this will become impractical even for a reasonably large number of servers. Providing IP address resolution using the DNS of the CDSP also has certain drawbacks, such as source IP address inaccuracies and inaccuracies due to DNS caching.

For example, when a DNS request is received, the CDSP DNS checks the source IP address on the request, and based on this, returns the IP address of the CDS "closest" to the source IP address. This decision is made based on the assumption that the source IP address on the request is either the IP address of the user or one "close" to the user. But this may not be the case in practice. The source address on the DNS request is the IP address of the entity that sends the DNS request to the CDSP DNS. Normally, this is the local DNS server on the user site. Depending on how DNS requests are forwarded, it could also be a DNS server further along the hierarchy from the local DNS. Therefore, the selected CDS is "closest" to the entity that sends the DNS request, but not necessarily "closest" to the user. Server selection based on local DNS server IP addresses can result in a non-optimal server selection, since users are frequently distant from their local DNS severs.

Inaccuracy due to DNS caching may occur when the CDSP DNS returns the IP address of the "closest" CDS. This IP address is cached by the browser and subsequently used to resolve domain names to IP addresses locally. This means that subsequent DNS queries to the same domain name will not be sent to the CDSP DNS until the cached information is flushed. A non-optimal CDS may be used for this period of time if the network conditions change. Similarly, the local DNS, or one of the DNS servers upstream towards the CDSP DNS, could also cache DNS information. This type of DNS caching may lead to inaccurate server selection. One way to address this issue is to specify a DNS timeout (i.e., time-to-live (TTL)) that is very small. There are, however, two problems with this approach. One problem is that the DNS caches do not need to obey the timeouts.

A second problem is that it is difficult to select this timeout. The timeout needs to be small enough so that dynamic server selection is possible. On the other hand, a DNS timeout value that is too small will lead to very frequent DNS lookups at the CDSP DNS server. In addition to the drawbacks discussed above, DNS requests themselves add to the response time when content is retrieved from a CDN. DNS requests for rewritten URLs account for a significant overhead and clearly reduce the benefits of having content replicated at the network edge. For example, studies have shown that the user response time to access a top-level page (where a user enters the URL in a browser or clicks on a link) needs to be within three to four seconds; otherwise, the user may stop the download of the top-level page.

Accordingly, neither authoritative DNS nor URL rewrite is a viable technique for providing user specific redirection. Therefore, there is a need in the art for a method and apparatus that enables efficient implementation of user specific redirection in a packet switched network.

SUMMARY OF THE INVENTION

The disadvantages heretofore associated with the prior art are overcome by a novel method and apparatus for providing user specific request redirection in a content delivery network includes parsing a page having embedded objects intended for redirection to at least one cache server. The embedded objects are then transformed into relative uniform resource locators (URLs).

A content-base token is inserted into an HTTP response header in response to a user request for the page. In an instance where the content-base token is not supported by the server and/or client devices, a base token is inserted into the html page in response to a user request for the page. The content-base token and base token provide identification of a server where the embedded objects in the page are to be retrieved. The requested html page is then sent to the user's browser.

The user's browser constructs absolute URLs from the embedded URLs using either the received content-base token or base token. The absolute URLs are then used by the browser to retrieve the embedded objects from the server.

BRIEF DESCRIPTION OF THE DRAWINGS

The teachings of the present invention can be readily understood by considering the following detailed description in conjunction with the accompanying drawings, in which:

FIG. 5 depicts a flow diagram illustrating the insertion of a Content-Base token into a header of an HTTP response, according to the method 200 of FIGS. 2A and 2B;

To facilitate understanding, identical reference numerals have been used, where possible, to designate identical elements that are common to the figures.

DETAILED DESCRIPTION OF THE INVENTION

The present invention provides a method and apparatus of providing user specific request redirection in a content delivery network based on either a HTTP response header modification with a Content-Base token, or in an instance where a Content-Base token in a HTTP response header cannot be used, inserting a Base token value within a hypertext markup language (html) page, both of which enables user specific redirection to be implemented very efficiently. The method and apparatus are referred to as "Request Deflection." One advantage of request deflection is that it may be implemented in a switch at the packet level and at wire-speed.

Figure 1:
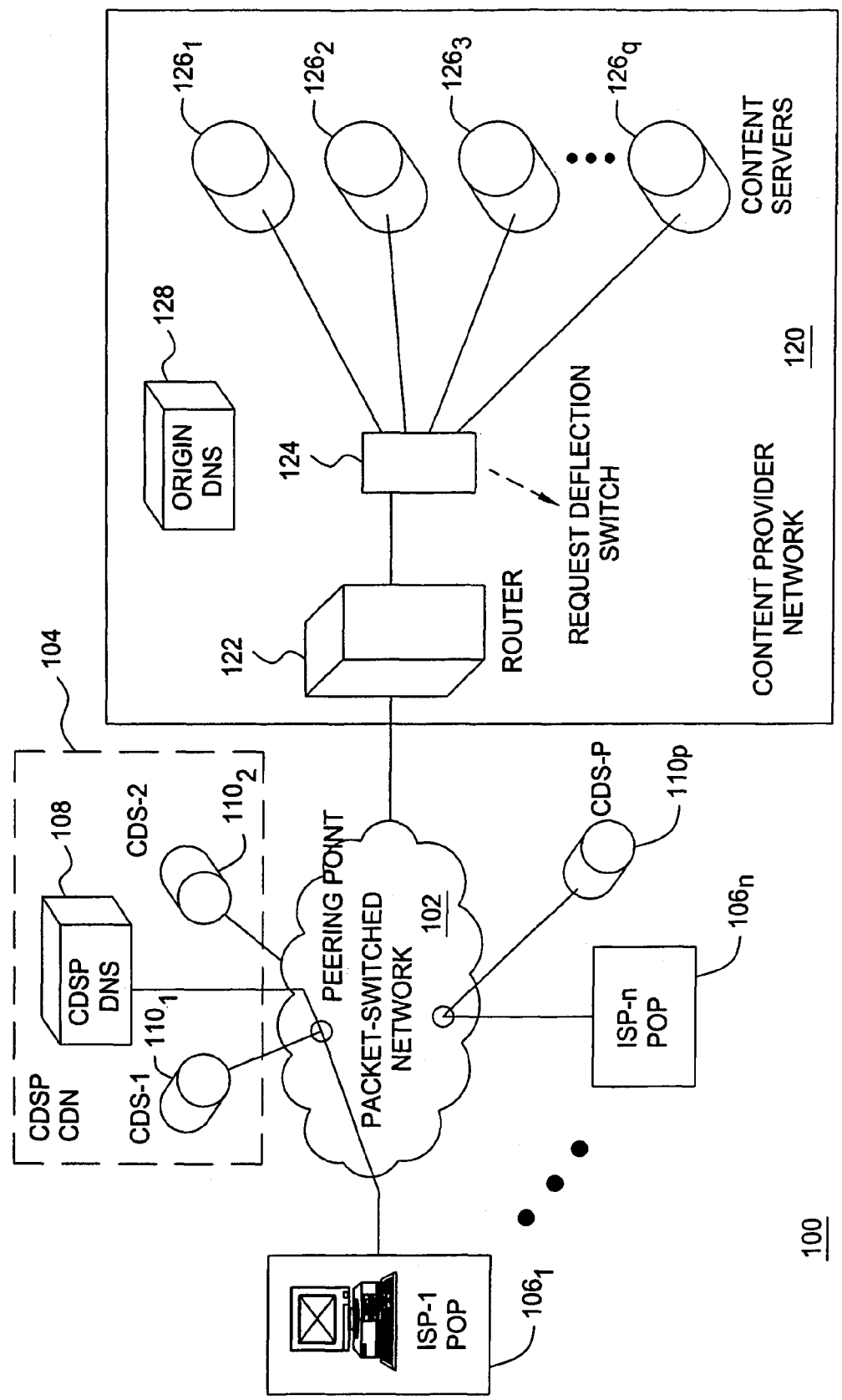
FIG. 1 depicts a high-level block diagram of an exemplary packet-switched network suitable for implementing the present invention.

FIG. 1 depicts a high-level block diagram of an exemplary network 100 suitable for implementing the present invention. The network 100 comprises a plurality of Internet Service Provider (ISP) points of presence (POP) $106_1$ through $106_n$ (collectively ISP-POPs 106), at least one content delivery network (CDN) 104, which is operated by a content delivery service provider (CDSP), a packet switched network 102, and a content provider network 120.

An ISP-POP 106 is illustratively used by a user requesting content, illustratively, using a conventional computer device (e.g., laptop, PDA, workstation, among others) having a web browser installed thereon. Specifically, a CDSP provides connectivity between the user's computer device and the content provider network 120 via the CDN 104 and the packet switched network, such as the Internet 102. Although only one CDN 104 is illustratively shown in FIG. 1, one skilled in the art will appreciate that a plurality of CDNs 104 may be connected to the Internet 102 to provide content to client computer devices.

The content provider network 120 comprises a plurality of content (origin) servers 126, through $126_q$ (collectively content servers 126), an origin DNS 128, an optional router 122, and a request deflection switch 124 of the present invention. A content server 126 is coupled to the Internet 102 via the request deflection switch 124. In an instance where there are multiple content servers 126, as illustratively shown in FIG. 1, a router or switch 122 may be utilized to route information to/from the content server 126 associated with user requested content. Although the router 122 and request deflection switch 124 are illustratively shown as functionally separate entities, one skilled in the art will appreciate that a single routing/switching device may be utilized to facilitate both the functions of the router 122 and the request deflection switch 124.

A content delivery network (CDN) 104 comprises a set of cache servers $110_1$ through $110_p$ (also referred to as "Content Delivery Servers" (CDSs), collectively CDSs 110) on the edge of the network 104, as well as a domain name server (DNS) infrastructure 108, which is used to route user requests to the nearest CDS 110.

Content delivery service providers (CDSP) enable distribution of content (e.g., html pages and associated embedded objects) from the origin sites (i.e., content servers 126) to the edge (cache) servers 110 on the edge of the network 102, and deliver content to the users from these edge servers 110. The distribution mechanism may be based both on push technologies such as multicasting the data to all the edge servers through terrestrial or satellite links or pull technologies such as those used by proxies. The goal is to decrease the latency of user access to the objects by delivering the objects from an edge server closest to the user.

For this to work, the DNS requests sent from the user browser needs to be directed to the DNS 108 of the CDSP 104. As discussed above, one technique is for the CDSP 104 to "takeover" the DNS functionality of the origin site so as to become the "authoritative DNS" for the origin. However a problem with this approach is that all the objects from the domain that has been taken over need to be served from the CDSs 110. This technique will not work, for example, if it is required that all the html pages are served from the origin site 126, but all the images (e.g., gifs and jpgs) are served from the CDSs 110. Accordingly, the request deflector device 124 of the present invention helps overcome the problems associated with the prior art.

Figure 7:
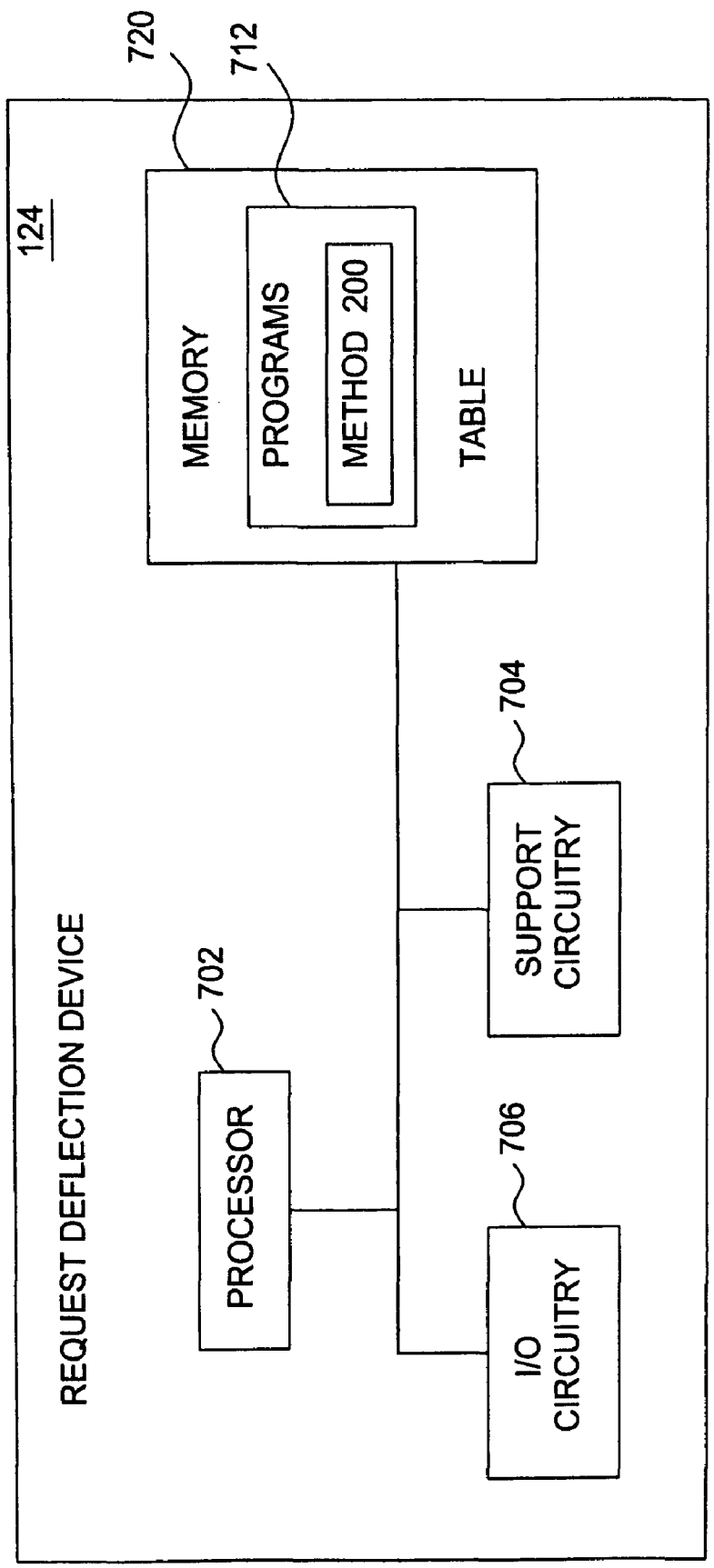
FIG. 7 depicts a high-level block diagram of a request deflection device suitable for use in the network of FIG. 1.

FIG. 7 depicts a high-level block diagram of a request deflection device 124 suitable for use in the network 100 of FIG. 1. Specifically, the request deflection device 124 of FIG. 7 comprises a processor 702 as well as memory 710 for storing various control programs 712. The processor 702 cooperates with conventional support circuitry 704, such as power supplies, clock circuits, cache memory and the like, as well as circuits that assist in executing the software routines, such as method 200, which is stored in the memory 710. As such, it is contemplated that some of the process steps discussed herein as software processes may be implemented within hardware, for example, as circuitry that cooperates with the processor 702 to perform various steps. The request deflection device 124 also contains input/output (I/O) circuitry 706 that forms an interface between the various functional elements communicating with the request deflection device 124. For example, in the embodiment of FIG. 1, the request deflection device 124 communicates with the origin servers 126, and optionally the router 122.

Although the request deflection device 124 of FIG. 7 is depicted as a general-purpose computer that is programmed to perform various control functions in accordance with the present invention, the invention can be implemented in hardware such as, for example, an application specific integrated circuit (ASIC). As such, it is intended that the processes described herein be broadly interpreted as being equivalently performed by software, hardware, or a combination thereof.

Figure 2A:
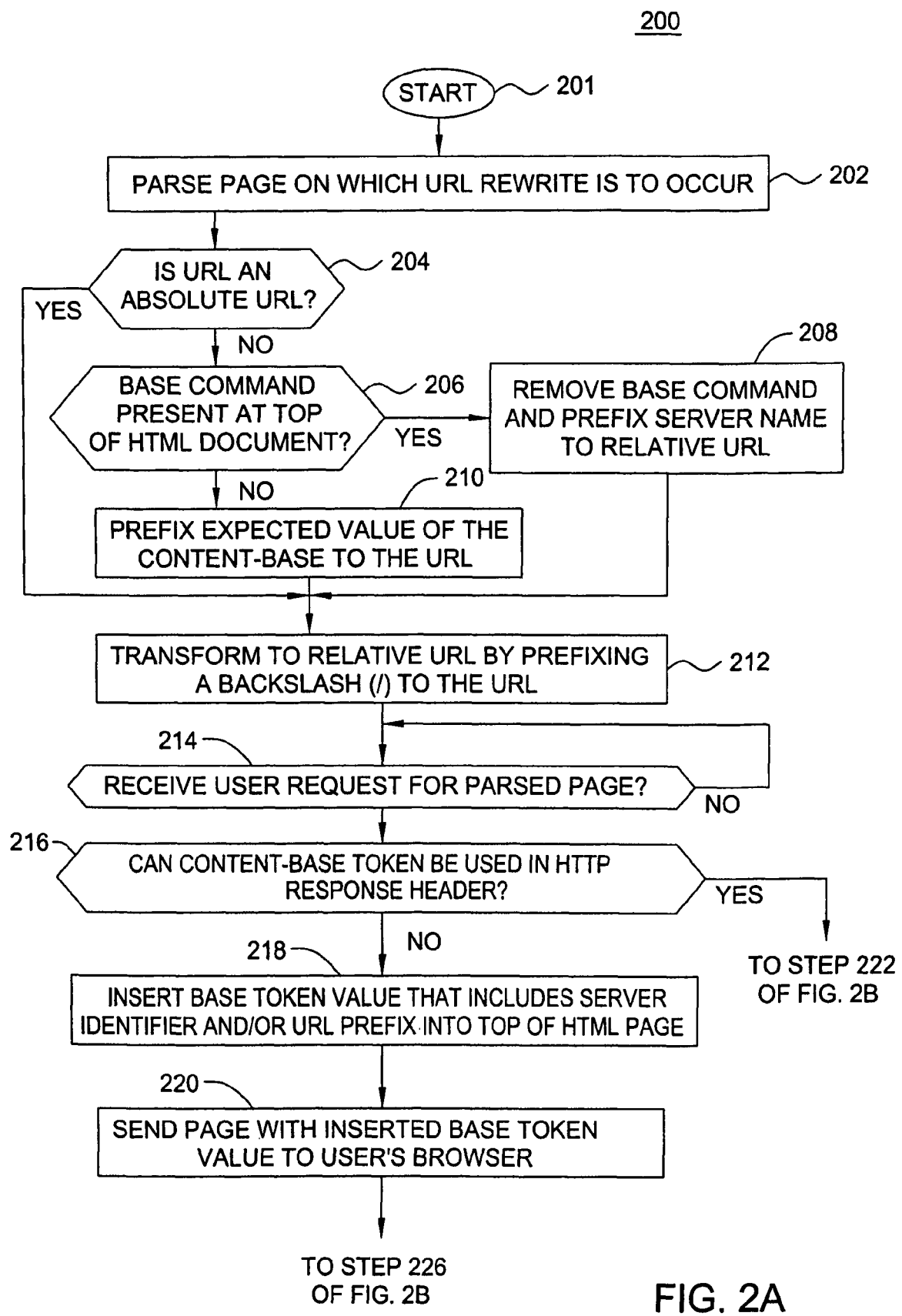
FIGS. 2A and 2B depict a flow diagram of a method of providing request deflection to enable user specific redirection in accordance with the principles of the present invention.
Figure 2B:
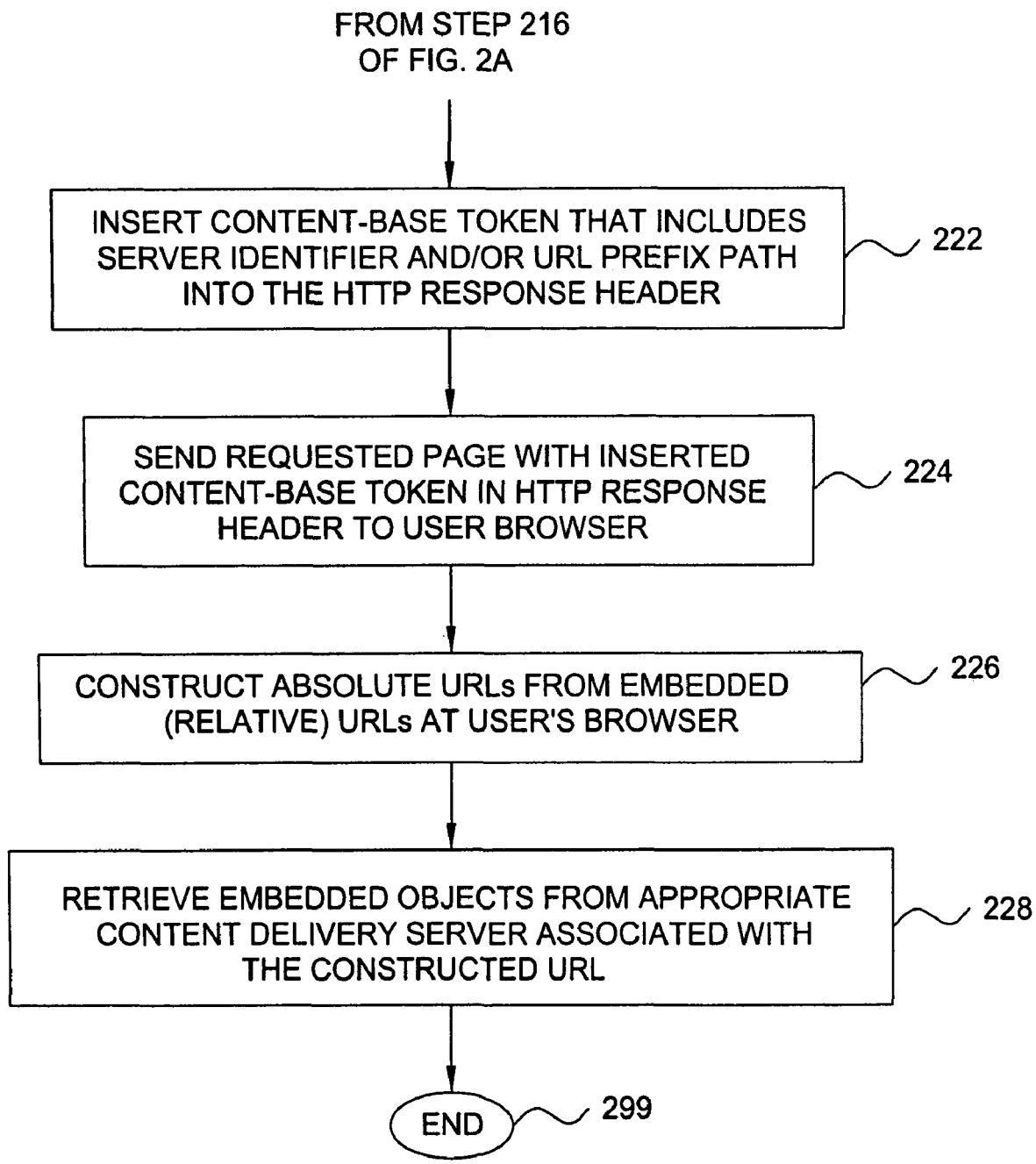

FIGS. 2A and 2B depict a flow diagram of a method 200 of providing request deflection to enable user specific redirection in accordance with the principles of the present invention. The Request Deflection method 200 enables user specific redirection without the need for parsing the html page every time a user request is received, or performing a URL rewrite on the page a priori in all possible ways and caching these page copies. There are two major parts to the Request Deflection process, as discussed below. The first part includes a priori transformation of embedded URLs, where the page on which URL rewrite is to be performed is parsed and the embedded URLs are transformed. This transformation is performed only once and the transformed page is cached. The second part includes on-the-fly HTTP response header modification, which is performed every time a user request is received.

Referring to FIG. 2A, the method 200 starts at step 201, and proceeds to step 202, where the page on which URL rewrite is to be performed is parsed. That is, the content associated with the top level page, as well as any embedded content, is associated with its corresponding URL. The method 200 then proceeds to step 204.

At step 204, a determination is made whether the URL associated with the content requested by the user is an absolute URL. That is, from the parsed URLs associated with the content of the requested page, a determination is made whether any of the parsed URLs are absolute URLs. An absolute URL is defined as a string of characters representing the domain name or IP address of the server, a complete directory path, and object name, which collectively and uniquely identify (i.e., locate) the object associated with a requested html page.

If at step 204, the determination is affirmatively answered, i.e., the requested URL is an absolute URL, the method 200 proceeds to step 212. At step 212, the absolute URL is transformed to a relative URL by prefixing a backslash ("/") to the absolute URL. Thus, the prefixing of the backslash to a URL causes such URL to be considered a relative URL.

Figure 3:
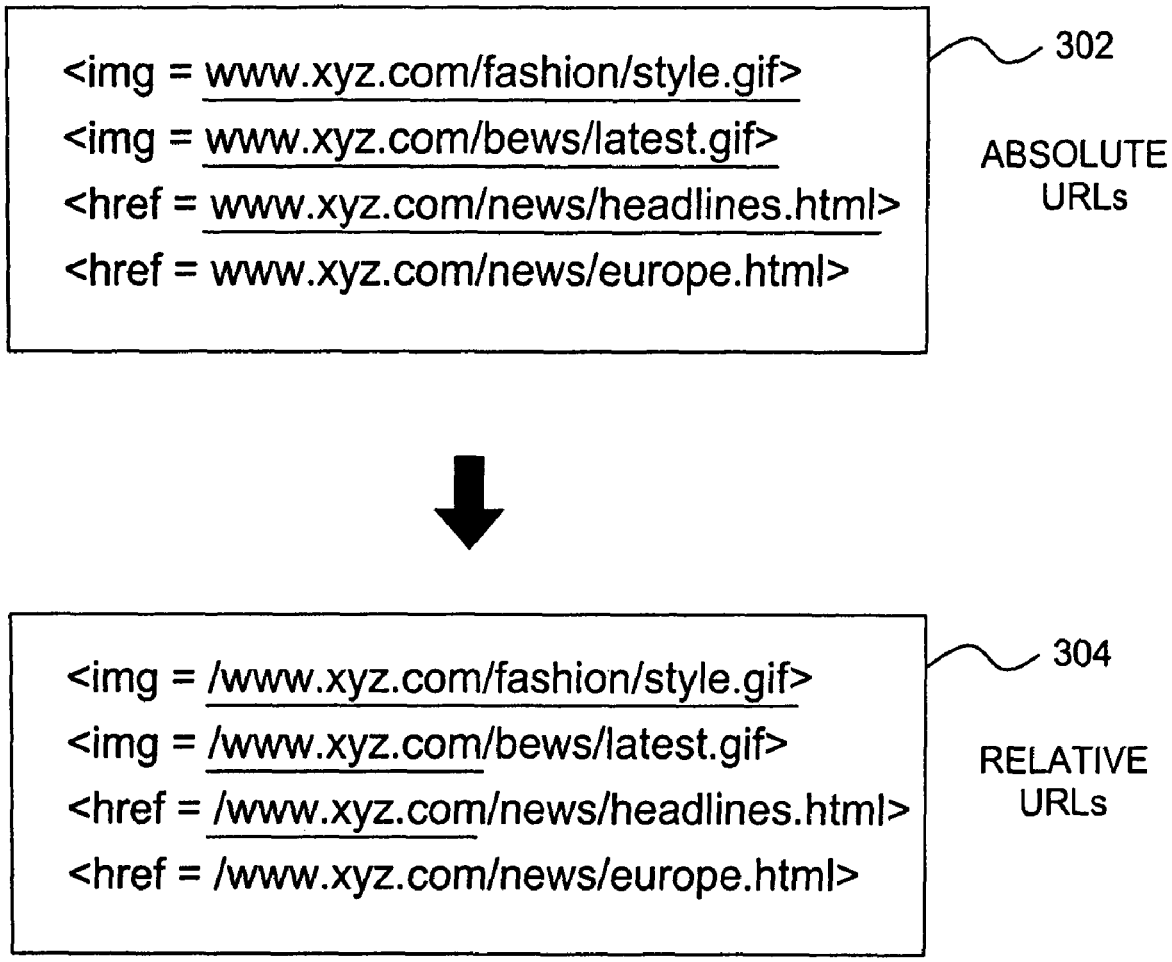
FIG. 3 depicts a flow diagram illustrating transformation of absolute URLs in accordance with the method of FIGS. 2A and 2B.

FIG. 3 depicts a flow diagram illustrating transformation of absolute URLs in accordance with the method 200 of FIGS. 2A and 2B. Referring 302 of FIG. 3, four exemplary absolute URLs that are associated with the parsed content from the top level page of the domain name "www.xyz.com" are shown. All the embedded absolute URLs that are to be redirected to CDSs 110 are converted into relative URLs. Note that the domain name of the CDSP is not prefixed to the embedded URLs, but at 304, the URLs have only been changed to relative URLs by prefixing a backslash (/).

If at step 204, the determination is negatively answered, i.e., the requested URL is not an absolute URL, the requested URL is considered to be a relative URL. A relative URL is defined as a complete directory path and object name, which collectively and uniquely identify (i.e., locate) the object associated with a requested html page within a server. It is noted that a relative URL does not include a server identifier (i.e., server name or IP address). If a relative URL exists in the html page, in one embodiment a <BASE= . . . > command may also be present at the top of the html document, which indicates the server from which this object needs to be retrieved.

Otherwise, if there is not a <BASE= . . . > command present at the top of the html page, in one embodiment, the expectation is that the server will add a Content-Base token to the HTTP header, which points to the server name (or IP address) of the main page that contains these embedded objects. That is, if a <BASE= . . . > command is not present at the top of the html document, in an embodiment of the invention, a Content-Base token identifying the server name or IP address containing the object is added to the HTTP header. It is noted that the HTTP header contains a token <Content-Base= . . . >, which value is provided in an instance where the Base command is not present in the html document.

Referring to FIG. 2, the method 200 proceeds to step 206, where a determination is made as to whether a Base command is present at the top of the hypertext markup language (html) document. The Base command includes a value that indicates the server 126 from which an object needs to be retrieved. If at step 206, the determination is affirmatively answered, i.e., a Base command value is present at the top of the html document, the method 200 proceeds to step 208. At step 208, the Base command is removed from the top of the html document, and the server name associated with the Base command is prefixed to the relative URL. The method then proceeds to step 212, where the prefixed relative URL is maintained as a relative URL by prefixing a backslash to the URL from step 208.

If at step 206, the determination is negatively answered, i.e., a Base command is not present at the top of the html document, the method 200 proceeds to step 210. At step 210, the value of the Content-Base that is expected to be included by the server is prefixed to the relative URL. The Content-Base value will point to the server domain name, server IP address, or a directory in the server containing the embedded object. The method then proceeds to step 212, where the prefixed relative URL is maintained as a relative URL by prefixing a backslash to the URL from step 210.

Figure 4:
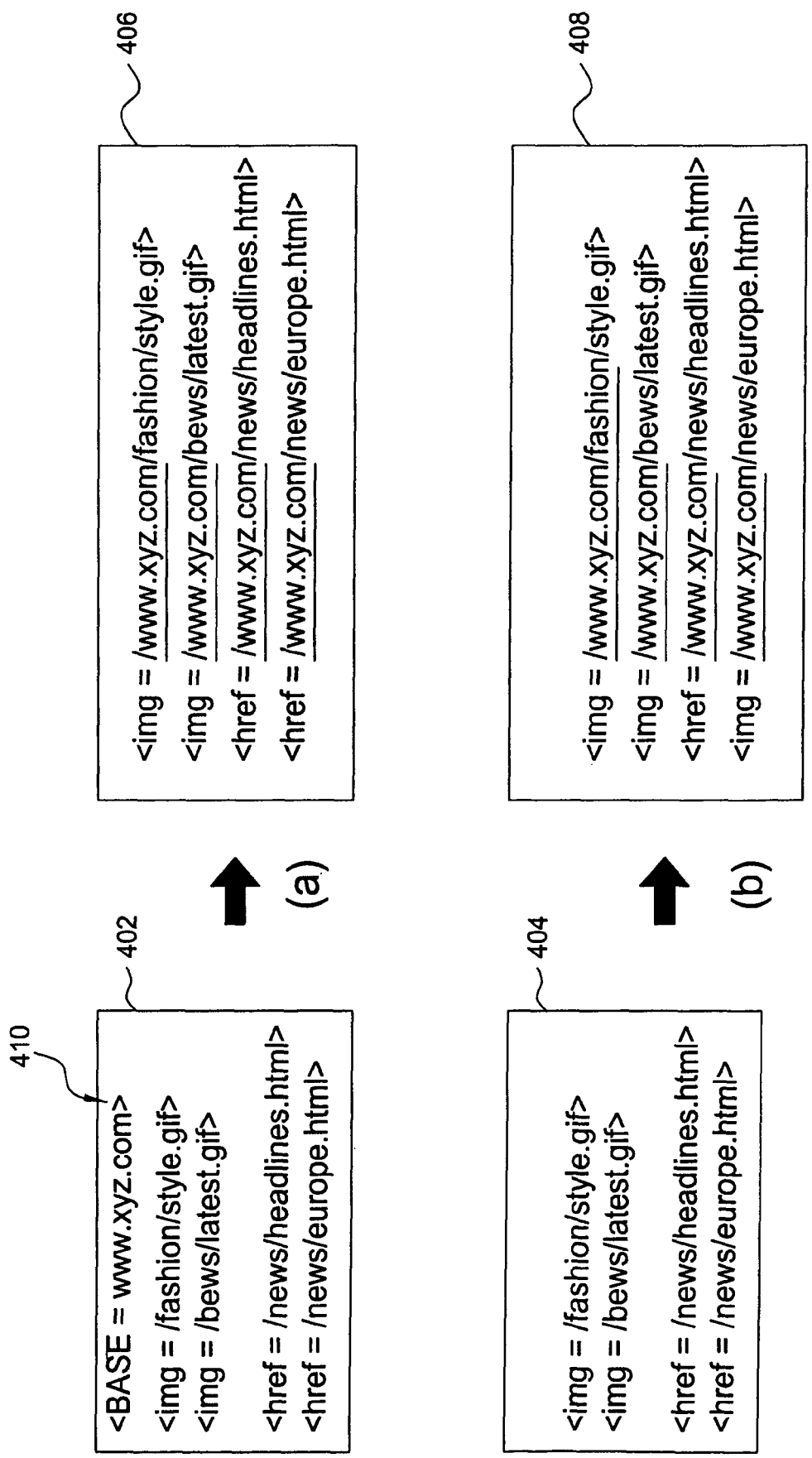
FIG. 4 depicts a flow diagram illustrating transformation of relative URLs in accordance with the method of FIGS. 2A and 2B.

FIG. 4 depicts a flow diagram illustrating transformation of relative URLs in accordance with the method 200 of FIGS. 2A and 2B. In FIG. 4(a), it is illustratively assumed that the server name where the main page is present is www.xyz.com. A page 402 is shown having a <BASE= . . . > command (i.e., value) 410, where the exemplary Base command is <BASE=www.xyz.com>. At 406, the server name found in the Base command is prefixed to the relative URLs. After prefixing this relative URL, the embedded URL is left in a relative form, such that a backslash character (/) is prefixed to the URL.

In one embodiment, FIG. 4(b) shows a page 404 without a <BASE= . . . > command value at the top of the html page, but with the expectation that the server will send a Content-Base token (value) as part of the HTTP header, which is either the server name (e.g., www.xyz.com) or IP address where the main page is located. At 408, this page is similarly transformed by prefixing the server name (e.g., www.xyz.com) of the main page, and leaving it intact as a relative URL with a backslash character (/) in the front of the directory path and object name.

Once the a priori transformation of embedded URLs is completed at steps 201 through 212, the method 200 proceeds to steps 214 through 228, where either on-the-fly HTTP response header modifications is performed, on-the-fly, for each user specific request, or if the Content-Base is unavailable, a Base token value will be added to the html page.

The second part (steps 214-228) of method 200 is performed every time a user request is received. In particular, at step 214, a determination is made whether a request for content associated with the parsed page was received. Recall that the parsing of the top-level page is performed only once, prior to receiving any user requests for such content. If at step 214, no request for the content is received by the request deflection switch 124, the method 200 waits until such a user request is received. Once a request for content is received from at least one user (step 214), the method 200 proceeds to step 216.

At step 216, a determination is made whether a Content-Base token can be used in the HTTP response header. Specifically, some servers may not support the prefixing of a Content-Base token in the HTTP header of a packet. Thus, if the determination at step 216 is answered negatively, the method 200 proceeds to step 218, where the Base token value that includes a server identifier and/or the URL prefix path of the content is inserted at the top of the html page. That is, to overcome the lack of server support for inserting a Content-Base token in the HTTP header, the server domain name, IP address, and/or URL prefix identifying where the main page is located is inserted in the html page requested by the user. At step 220, the requested page is sent to the user's browser and method 200 then proceeds to step 226, as discussed below in further detail. Thus, the Base token value 410 becomes part of the data, as opposed to being a part of the HTTP response header.

If at step 216 the determination is answered affirmatively (i.e., the Base token value is inserted in the html page), the method 200 proceeds to step 222. At step 222, the server 126 inserts a Content-Base token (value) in the HTTP response header, which contains the server name (i.e., server name and/or URL prefix path) or the IP address (i.e., IP address and/or URL prefix path) from which the embedded objects in the page need to be retrieved. At step 224, the server sends the requested page with the Content-Base token in the HTTP response header to the browser of the user. Inserting the Content-Base token on-the-fly for each user is a fast operation, compared to the server 126 having to parse the html page every time a user request is received. That is, the on-the-fly HTTP response header modification allows the server 126 to rewrite the page differently for each user with respect to the server name or server IP address from which the object it to be retrieved.

FIG. 5 depicts a flow diagram illustrating the insertion of a Content-Base token into a header of an HTTP response, according to the method 200 of FIGS. 2A and 2B. Referring to FIG. 5, the transformed relative URL (step 212) includes at 504, the Content-Base token (e.g., www.cdsp.com) prefixed to the relative URL, as discussed above with respect to step 222.

As an example of request deflection using different DNS hierarchies, consider requests from four different users C1, C2, C3, and C4. Assume that to provide QOS service differentiation, users C1 and C2 need to be redirected to www.cdsp1.com, user C3 needs to be redirected to www.cdsp2.com, and user C4 needs to be redirected to www.cdsp3.com. For each of these requests, a CDS 126 will serve a transformed object (using steps 202-212 of FIG. 2) as defined by the Content-Base token inserted in the HTTP header. That is, for C1 and C2, the Content-Base token is Content-Base: http://www.cdsp1.com, for C3 the Content-Base token is Content-Base: http://www.cdsp2.com, and for C4 the Content-Base token is Content-Base: http://www.cdsp3.com.

At step 226, the user's web browsers construct the embedded URLs. Step 226 is performed either after step 220, where html page having the inserted Base token value therein is sent to the user's browser, or after step 224, where the requested page with the inserted Content-Base token is sent to the user's browser. The user's web browser constructs the absolute URLs by prefixing the value from either the Content-Base token or the Base token to the embedded (relative) URL in the page. For example, the user browsers at C1 and C2 will construct the embedded URLs as http://www.cdsp1.com/www.xyz.com/fashion,style.gif, etc.

At step 228, the user's web browser retrieves the requested embedded object from the appropriate content delivery server 110. For example, the user browsers at C1 and C2 will retrieve the requested objects from www.cdsp1.com. Similarly, C3 and C4 will respectively retrieve the requested objects from www.cdsp2.com and www.cdsp3.com. Once the requested object has been retrieved by the user's browser, the method 200 proceeds to step 299 where method 200 ends.

Request deflection may also be performed using different URL-prefixes. It is assumed that request deflection needs to be performed using different URL-prefixes so that the CDS can provide different levels of service to different user requests. For example, assume that users C1 and C2 need to be provided level 1 service, whereas users C3 and C4 require level 2 services. For the requests from these users, the CDS will serve the transformed objects, but will include a Content-Base token as part of the HTTP header, which will be "Content-Base: http://www.cdsp.com/level1" for users C1 and C2, and "Content-Base: http://www.cdsp.com/level2" for users C3 and C4.

The user browser at C1 and C2 will construct the embedded URLs illustratively as "http://www.cdsp.com/level1/www.xyz.com/fashion/style.gif, etc." The user browser at C3 and C4 will construct the embedded URLs illustratively as http://www.cdsp.com/level2/www.xyz.com/fashion/style.gif, etc." The servers that receive requests from C1 and C2 will receive the URL path as /level1/www.xyz.com/fashion/style.gif, etc., while the servers that receive requests from C3 and C4 will receive the URL path as /level2/www.xyz.com/fashion/style.gif, etc. The servers, which are aware of the structure of the URLs, will provide level 1 or level 2 service depending on the path received.

Request deflection may also be performed using IP addresses. Here it is assumed that for users C1, C2, C3, and C4, the "closest" servers are respectively IP1, IP2, IP3, and IP4. For each of these requests, the server will serve the transformed object, but will include a Content-Base token (step 222) as part of the HTTP response header, which will be Content-Base: IP1 for C1, Content-Base: IP2 for C2, Content-Base: IP3 for C3, and Content-Base: IP4 for C4, in an instance where the Base command is used in the html page (step 216). Alternatively, in an instance where the Content-Base token cannot be used in the HTTP response header (step 216), a Base token value will be included in requested html pages, which will also be Base: IP1 for C1, Base: IP2 for C2, Base: IP3 for C3, and Base: IP4 for C4. In either case, the user browser at C1 will construct the embedded URLs as http://IP1/www.xyz.com/fashion/style.gif, and so forth, and retrieve these objects from IP1. Similarly, C2, C3, and C4 will retrieve the objects from IP2, IP3, and IP4.

The second part of method 200 (i.e., steps 214-228) associated with each user request requires very little overhead, and in one embodiment may be implemented in a reverse proxy. Further, adding a Content-Base token may be performed at wire-speed in a switch.

Figure 6:
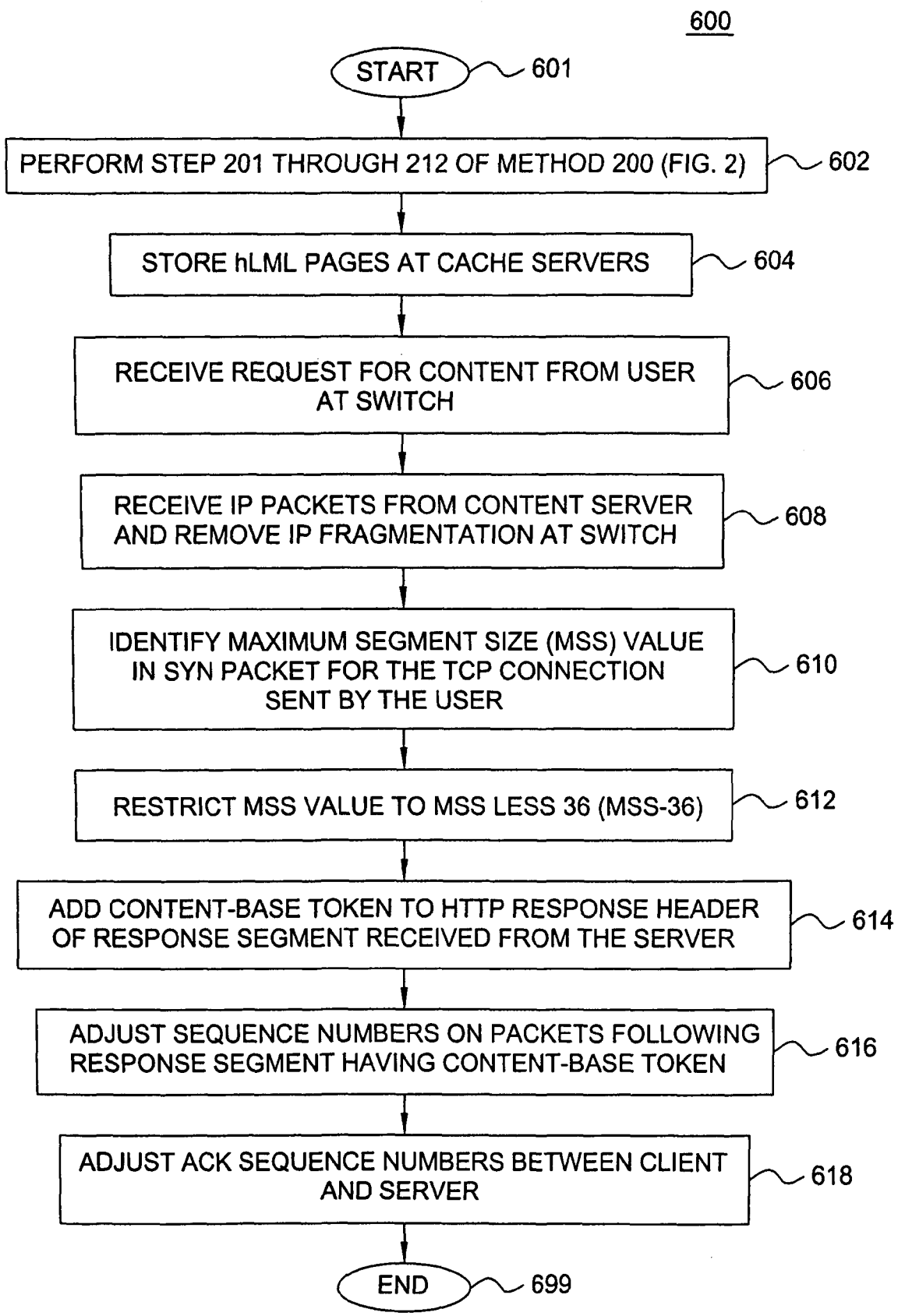
FIG. 6 depicts a flow diagram of a method for providing wire-speed request deflection, in accordance with the principles of the method of FIGS. 2A and 2B.

FIG. 6 depicts a flow diagram of a method 600 for providing wire-speed request deflection, in accordance with the principles of the method 200 of FIGS. 2A and 2B. The method 600 starts at step 601 and proceeds to step 602, where steps 201 though 212 of method 200 are performed. As described above, the request deflection process can be performed a priori and the html page can be cached. The method 600 then proceeds to step 604, where the server stores html pages (after having previously performed steps 202-212). Here the goal is to perform steps 214-228, which is performed on a per user request basis, at wire-speed, using a switch in front of the server.

Method 600, which provides on-the-fly HTTP response header modifications at wire-speed, is discussed in terms of using IP addresses. When a main page is sent from the server to the user, if a Content-Base token is found in the HTTP response header, the value of the Content-Base token is changed to http://IP, where IP is the IP address of the server from which the embedded objects will be retrieved. If a Content-Base token does not exist, the string Content-Base: http://IP is introduced into the HTTP response header. Method 600 considers the case where the Content-Base token does not exist, and is introduced into the HTTP response header. The case where a Content-Base token already exists can be considered as a situation where the existing token is removed and a new token that contains the IP address is introduced.

At step 606, the switch 124 receives a request for content from a web page provided by a server 126. At step 608, the Content-Base token will be included into IP packets after re-assembly of IP fragments. That is, IP packets that are received at the switch 124 are re-assembled to remove IP fragmentation, and thereafter the Content-Base token is added. At the switch, new TCP segments cannot be introduced into the flow. Specifically, when the Content-Base token is introduced into an IP packet, the resulting IP packet cannot exceed beyond a TCP segment.

At step 610, the switch 124 identifies the maximum segment size (MSS) value received in the SYN packet that was sent by the user to establish the TCP connection. At step 612, the MSS value is restricted to accommodate the additional characters necessary to provide the Content-Base token. In particular, the maximum size of the string that will be added to the IP packets will be string length strlen(Content-Base)+strlen(http://)+strlen(maximum number of characters in an IP address)+an end-of-line (EOL) character. The string length corresponding to the number of characters to insert the word "content base" is 13, the string length corresponding to the number of characters to insert "http://" is 7, the maximum number of characters in an IP address is 15, and the EOL character is 1. Thus, the maximum number of characters added will be 13+7+15+1=36. In order to accommodate these 36 bytes in a TCP segment without overflowing the segment, at step 612, the MSS value is restricted to a value of the MSS value sent by the user, less 36. That is, the server can only send TCP segments whose maximum length is 36 bytes less than the maximum segment size (MSS) that has been announced by the user. This way, the extra 36 bytes for the header modification may be added to a TCP segment without exceeding the client requirement.

In particular, when the SYN packet for the TCP connection from the client (which will download the main page) is received at the switch, the value of the MSS TCP option is decreased by 36. For example, if the original MSS sent by the user is 1460, the MSS value is changed to 1424 (i.e., 1460–36). This way, the server is forced to send TCP segments whose size does not exceed 1424.

At step 614, when the HTTP response is received from the server, the Content-Base token is added to the HTTP response header. Given that different tokens of the HTTP header can appear anywhere in the header, it is possible to add this header to the first response segment that is received from the server. Even after this addition, the TCP segment size will not exceed 1460 and is acceptable to the client. In order to accommodate the change in the size of the TCP segment, at step 616, the sequence numbers on all packets that follow this modified packet from the server to the client are modified accordingly. Further, at step 618, the ACK packet for this modified packet, as well as any subsequent packets from the client to the server, is also adjusted accordingly.

For example, assume that after the addition of the Content-Base token, the length of the segment is increased by x, where x≦36. The ACK sequence numbers on all packets from the server to the client that follow the modified packet is decreased by x, while the sequence number on the ACK for the modified packet, as well as subsequent packets from the client to the server are increased by x. It is noted that the length field of the modified packet are adjusted as well. The method 600 then proceeds to step 699, where the method 600 ends.

The drawback of decreasing the MSS indicated to the CDS is that the CDS is forced to send TCP segments smaller than what the user can accept. This means the CDS may end up sending more TCP segments. However, this minor tradeoff is justified because the main pages are mostly of small size and should fit in a few TCP segments. Thus, the number of extra TCP segments sent will be minimal.

It is noted that a Request Deflection device (either a reverse proxy or a switch) needs a mechanism to decide the mapping between a user request and the IP address of the server that should be chosen to serve the embedded objects. One technique is to download the mapping table into the Request Deflection device. Currently the CDSP DNS 108 serves two main functions. One function is to collect information about the network 104 and the status of the CDSs 110, as well as run a proprietary algorithm based on this information to construct a table of user IP address to CDS IP address mapping. A second function performed by the CDSP DSN 108 is to reply to DNS requests from the users with the IP address of the appropriate CDS.

With Request Deflection using IP addresses, the CDSP DNS 108 still computes a table of user IP address to CDS IP address mapping, but instead of serving as a DNS server, the CDSP DNS 108 downloads the table into Request Deflection device. There are two problems with this solution. One problem is that the CDSP DNS (which is now only an IP address mapper) 108 needs to download this information into all the Request Deflection devices 124 that may exist in the CDSP network. This problem is compounded by the fact that normally a single CDSP DNS server does not compute all users to CDS mapping. Rather, the computation is performed by multiple DNS servers in the CDSP DNS hierarchy. This means that information will need to be downloaded into all the Request Deflection devices 124 from all the DNS servers that compute the mapping. Secondly, the table size could be large, such that storing this table at all the Request Deflection devices 124 may be difficult. This approach may be feasible only with small CDSP networks 104, like the ones that will be found within an enterprise (enterprise level CDSP networks), as opposed to large CDSP networks.

To overcome these deficiencies, the present invention performs address lookups at the Request Deflection device 124. In particular, instead of downloading the mapping table, the Request Deflection device 124 performs an operation similar to a DNS lookup at the CDSP DNS 108, whenever a user to CDS mapping entry is needed. The Request Deflection device 124 sends the IP address of the user to the CDSP DNS 108, which will return the IP address of the optimal CDS for that user to the user's browser. When such an approach is followed, there is no need to maintain and update a table at the request deflection device 124, and the scalability of the CDSP network is not a problem anymore.

It is noted that this solution requires that the CDSP DNS 108 be changed so that it understands queries sent by the Request Deflection device 124. In one embodiment, the CDSP DNS 108 allows the Request Deflection devices 124 to cache this information by providing a timeout value, where the Request Deflection devices 124 obey this value.

It is also noted that unlike the DNS lookups performed in current CDSP implementations, the user IP address that is sent to the CDSP DNS 108 is the IP address of the real user. It is also possible to send more detailed information to the CDSP DNS 108 about the user. For example, information such as the cookies contained in the request and the user browser information may be sent in addition to the user IP address. This way, the CDSP DNS 108 is able to return an IP address for a CDS 110 whose identity depends not only on the "closeness'" to the user, but also on other user characteristics. In fact, multiple users making requests from the same user machine could be identified and redirected to different CDSs 110, as required.

Further, the value returned by the CDSP DNS 108 does not just have to be the IP address. Rather, the CDSP DNS 108 may alternatively return a URL prefix that not only contains the IP address, but also information about the customer, such as making a request for billing purposes, serial numbers, and other such information that will enable the CDSs 110 to understand this request in a proprietary way.

User specific redirection is a useful technique for response personalization. This gives the ability for a content provider to differentiate users based on their IP addresses as well as other user identifiers, such as cookies and browser type, and provide service differentiation to these users although the objects are served to these users from a CDSP network. The present invention described herein makes user specific redirection practical over the prior art. One further advantage of the present invention is that it could be implemented at wirespeed in a switch.

It is noted that the Request Deflection requires all objects referred to by the embedded URLs in a given page to be retrieved from the same CDS, thereby not permitting different objects to be delivered from different CDSs. The reason for this is that Content-Base token can only specify a single server name or IP address to be used for all relative embedded objects in a given page.

However, all embedded objects from the same CDS is normally recommended to optimize end-user performance for various reasons. For example, when different embedded objects are fetched from different CDSs 110, client browsers generate new DNS lookups and new TCP connection setups for each CDS. These new DNS requests create a significant overhead, thus reducing the benefits of replicating content at the network edge. Further, with the advent of HTTP 1.1, which uses persistent connections to download objects, retrieving embedded objects from the same CDS enables the embedded objects to be retrieved over a single (or a few) TCP connections. This means, the TCP connection setup overhead is minimized.

Despite the fact that retrieving all objects from the same CDS 110 improves end-user experience, there are cases where different objects must be retrieved from different CDSs. For instance, different CDSs 110 may be required to handle streaming content and images. One solution to overcome this limitation is to host a set of CDSs needed for all content types (e.g. streaming, WAP content, images) under the same virtual IP address. These CDSs are then front-ended by a Layer 4 or Layer 7 switch (e.g., switch 122 of FIG. 1). The switch 122 can then be used to redirect different requests for different content types towards the right CDS based on the destination port number or on application specific information.

In some cases, for example, due to network topology or network engineering reasons, CDSPs may not be able to host a set of CDSs 110 needed for different content types under the same virtual address. When this occurs, the request deflection technique can provide user specific redirection for the set of objects that can share the same CDS. The rest of objects that cannot be delivered from the same CDS do not benefit from such redirection. Instead, the URLs that refer to these objects may be a priori rewritten using regular URL rewriting techniques, and the page is cached. When the page is retrieved from the cache server, the request deflection technique of the present invention is only applied to those URLs that have not been rewritten a priori. Although this is a limitation of the request deflection technique, in most instances a single CDS 110 will be able to handle all object types, or a switch 122 may be able to redirect requests for different object types into the right specialized CDS.

Although various embodiments that incorporate the teachings of the present invention have been shown and described in detail herein, those skilled in the art can readily devise many other varied embodiments that still incorporate these teachings.

What is claimed is:

1. A method for providing user specific request redirection in a content delivery network, comprising: parsing a page having one or more embedded objects intended for redirection to at least one cache server; transforming said one or more embedded objects into relative uniform resource locators (URLs); inserting a Content-Base token into a HTTP response header of said page in response to a user request for said page, said Content-Base token identifying at least one of a cache server and a URL prefix associated with a location of said one or more embedded objects; adjusting a maximum segment size (MSS) value received in a SYN packet that was sent by the user to establish a TCP connection, and sending said requested page with said Content-Base token toward said user.

2. The method of claim 1, wherein said transforming comprises:
determining whether a URL associated with an embedded object is an absolute URL; and if so, transforming said absolute URL to a relative URL.

3. The method of claim 1, wherein said transforming comprises:
identifying a relative URL; determining whether said relative URL comprises a base command present in said page associated with the embedded objects;
if so, removing said base command from said page; and prefixing a server identifier associated with said base command to said relative URL.

4. The method of claim 3, wherein said server identifier comprises one of a domain name and IP address.

5. The method of claim 3, wherein in an instance where said base command is not present in said page, said transformation further comprises: prefixing to said transformed URL, an expected Content-Base value that points to one of a cache server and URL prefix containing said embedded object.

6. The method of claim 5, wherein said Content-Base value comprises:
one of a domain name and IP address of a cache server associated with a requested object.

7. The method of claim 1, wherein said inserting a Content-Base token into a HTTP response header further comprises: inserting a URL prefix path into the HTTP response header.

8. The method of claim 1, further comprising: sending a requested page with said inserted Content-Base token in the HTTP response header to a browser associated with a user making a request for said page.

9. The method of claim 8, further comprising: constructing an absolute URL from an embedded URL at said user browser; and retrieving embedded objects from a server associated with said constructed absolute URL.

10. The method of claim 1, wherein said adjusting said MSS value comprises: reducing said MSS value by 36 characters.

11. The method of claim 10, further comprising: modifying sequence numbers for all packets following a packet having said Content-Base token inserted into its HTTP response header.

12. The method of claim 1, wherein said providing user specific request redirection in a content delivery network further comprises: performing said user specific request redirection from one of a request deflection device and a switch.

13. The method of claim 12, wherein performing said user specific request redirection from said request deflection device comprises: initiating a domain name server (DNS) request to a content delivery service provider domain name server (CDSP-DNS); sending at least an IP address of a user making a request for content to said CDSP-DNS; and receiving, from said CDSP-DNS, at least one of an IP address and domain name, and URL prefix of a content server; and assigning said at least one of an IP address and domain name as a value of a Content-Base token in a HTTP response header.

14. The method of claim 13, wherein said sending at least an IP address of a user further comprises sending additional information associated with said user.

15. The method of claim 13, wherein: said receiving, from said CDSP-DNS at least one of an IP address and domain name of a content server further comprises receiving a URL prefix associated with said content server; and said assigning said URL prefix with said at least one of an IP address and domain name as a value of said Content-Base token in said HTTP response header.

16. The method of claim 12, wherein performing said user specific request redirection from said request deflection device comprises: receiving a mapping table from a content delivery service provider domain name server (CDSP-DNS), said mapping table associating user related information including a user IP address, with a server IP address having said requested embedded objects.

17. A method for providing user specific request redirection in a content delivery network, comprising: parsing a page having one or more embedded objects intended for redirection to at least one cache server; transforming said one or more embedded objects into relative uniform resource locators (URLs); inserting a base token value into said page in response to a user request for said page, in an instance where a Content-Base token is not supported by a content server, where the base token provides identification of one of a cache server and URL prefix associated with a location of the one or more embedded objects; and sending said requested page with said inserted base token value toward said user.

18. The method of claim 17, wherein said transforming comprises:
determining whether a URL associated with an embedded object is an absolute URL;
and if so, transforming said absolute URL to a relative URL.

19. The method of claim 17, wherein said transforming comprises:
identifying a relative URL; determining whether said relative URL comprises a base command present in said page associated with the embedded objects; if so, removing said base command from said page; and prefixing a server identifier associated with said base command to said relative URL.

20. The method of claim 19, wherein said server identifier comprises one of a domain name and IP address.

21. The method of claim 19, wherein in an instance where said base command is not present in said page, said transformation further comprises: prefixing to said transformed URL, a base token value that points to one of a cache server and URL prefix containing said embedded object.

22. The method of claim 21, wherein said base token value comprises:
one of a domain name and IP address of a cache server associated with a requested object.

23. The method of claim 21, further comprising: sending a requested page with said inserted base token value to a browser associated with a user making a request for said page.

24. The method of claim 23, further comprising: constructing an absolute URL from an embedded URL at said user browser; and retrieving embedded objects from a server associated with said constructed absolute URL.

25. The method of claim 17, wherein said providing user specific request redirection in a content delivery network further comprises: performing said user specific request redirection from one of a request deflection device and a switch.

26. The method of claim 25, wherein performing said user specific request redirection from said request deflection device comprises: initiating a domain name server (DNS) request to a content delivery service provider domain name server (CDSP-DNS); sending at least an IP address of a user making a request for content to said CDSP-DNS; and receiving, from said CDSP-DNS, at least one of an IP address and domain name, and URL prefix of a content server; and assigning said at least one of an IP address and domain name as a value of a base token in a html page.

27. The method of claim 26, wherein said sending at least an IP address of a user further comprises sending additional information associated with said user.

28. The method of claim 26, wherein: said receiving, from said CDSP-DNS at least one of an IP address and domain name of a content server further comprises receiving a URL prefix associated with said content server; and said assigning said URL prefix with said at least one of an IP address and domain name as a value of said base token.

29. The method of claim 25, wherein performing said user specific request redirection from said request deflection device comprises: receiving a mapping table from a content delivery service provider domain name server (CDSP-DNS), said mapping table associating user related information including a user IP address, with a server IP address having said requested embedded objects.

30. Apparatus for providing user specific request redirection in a content delivery network, comprising: means for parsing a page having one or more embedded objects intended for redirection to at least one cache server; means for transforming said one or more embedded objects into relative uniform resource locators (URLs); means for inserting a Content-Base token into a HTTP response header of said page in response to a user request for said page, said Content-Base token identifying at least one of a cache server and URL prefix associated with a location of said one or more embedded objects; means for adjusting as a maximum segment size (MSS) in response to a size of said Content-Base token; and means for sending said requested page, with said Content-Base token inserted in said HTTP response header of said page, to said user.

31. Apparatus for providing user specific request redirection in a content delivery network, comprising: means for parsing a page having one or more embedded objects intended for redirection to at least one cache server; means for transforming said one or more embedded objects into relative uniform resource locators (URLs); means for inserting a base token value into said page in response to a user request for said page in an instance where a Content-Base token is not supported by a content server, where the base token identifies at least one of a cache server and URL prefix associated with a location of the one or more embedded objects; and means for sending said requested page with said inserted base token value toward said user.

* * * * *